US010398131B2

(12) United States Patent
Sporn

(10) Patent No.: US 10,398,131 B2
(45) Date of Patent: Sep. 3, 2019

(54) NO JUMP HARNESS

(71) Applicant: Joseph S Sporn, New York, NY (US)

(72) Inventor: Joseph S Sporn, New York, NY (US)

( * ) Notice: Subject to any disclaimer, the term of this patent is extended or adjusted under 35 U.S.C. 154(b) by 1088 days.

(21) Appl. No.: 14/254,642

(22) Filed: Apr. 16, 2014

(65) Prior Publication Data

US 2015/0296748 A1 Oct. 22, 2015

(51) Int. Cl.
*A01K 27/00* (2006.01)
*A01K 15/02* (2006.01)

(52) U.S. Cl.
CPC ........... *A01K 27/002* (2013.01); *A01K 15/02* (2013.01)

(58) Field of Classification Search
USPC ....... 119/863, 712, 725, 726, 792, 856, 907, 119/905; D30/151, 152, 145, 144
See application file for complete search history.

(56) References Cited

U.S. PATENT DOCUMENTS

| | | | | |
|---|---|---|---|---|
| 3,817,217 A | * | 6/1974 | Matuka | A01K 23/00 119/868 |
| 3,994,264 A | * | 11/1976 | Flynt | 119/815 |
| 5,845,606 A | * | 12/1998 | Hartman | 119/856 |
| 5,915,335 A | * | 6/1999 | Holt, Jr. | A01K 1/0263 119/770 |
| 6,101,979 A | * | 8/2000 | Wilson et al. | 119/725 |
| 6,637,377 B2 | * | 10/2003 | Lobanoff et al. | 119/792 |
| 7,963,256 B1 | * | 6/2011 | Horgan | A01K 27/002 119/792 |
| 8,171,892 B1 | * | 5/2012 | Horgan | 119/792 |
| 8,516,978 B2 | * | 8/2013 | Horiuchi | 119/792 |
| 2005/0072377 A1 | * | 4/2005 | Wanveer et al. | 119/856 |
| 2012/0024239 A1 | * | 2/2012 | Forbes | 119/850 |
| 2013/0180470 A1 | * | 7/2013 | Zimmerman | 119/856 |
| 2015/0020752 A1 | * | 1/2015 | Zimmerman | 119/792 |
| 2015/0090195 A1 | * | 4/2015 | Krupich | 119/792 |
| 2016/0007570 A1 | * | 1/2016 | Stout | A01K 27/002 |

* cited by examiner

*Primary Examiner* — Andrea M Valenti
(74) *Attorney, Agent, or Firm* — Hanes & Bartels LLC

(57) ABSTRACT

A dog harness to deter jumping comprising a neck collar, a brisket cinch, and at least one fabric panel overlying the forechest of the dog and interconnecting the neck collar and the brisket cinch at a harness anchor point below the dog's chest and a pair of hind leg loops with free ends that respectively encircle each hind leg of a dog above the stifle, a connection to merge the free ends to form a single abdominal connecting link that underlies the belly and abdomen of a dog, and a selective connection between the abdominal connecting link and the harness anchor point.

3 Claims, 5 Drawing Sheets

NO JUMP HARNESS

The present invention relates to harnesses for dogs that restrain and discourage the dog from jumping up with his fore paws on the body of a person or article.

BACKGROUND

Training an exuberant dog not to jump on a person or jump onto furniture is often an unrewarding task. A jump-prone dog is not only annoying; the jumping can be dangerous for older people who may be subject to being knocked over by such antics. Several prior patents have addressed the issue including, U.S. Pat. No. 8,516,978 to Jason Horiuchi for Animal Restraint System, which includes a disclosure for a no-jump/run module. U.S. Pat. No. 3,994,264 to William M. Flynt for Dog Restraining Harness also discloses a harness for preventing a dog from jumping.

The object of the present invention is to simplify and make the harnesses of the prior art more effective.

DETAILED DESCRIPTION OF PREFERRED EMBODIMENT

The act of a dog in moving from a standing position to an upright position with only its hind feet on the floor involves the use of a variety of muscle groups. During the jumping process, the head and neck of the dog and the forelegs are positioned to increase the distance between the neck and the hind legs. Accordingly, if a restraint is applied to limit or restrict extension of the hind legs the dog will be disinclined to continue the jump.

Figure 3A:
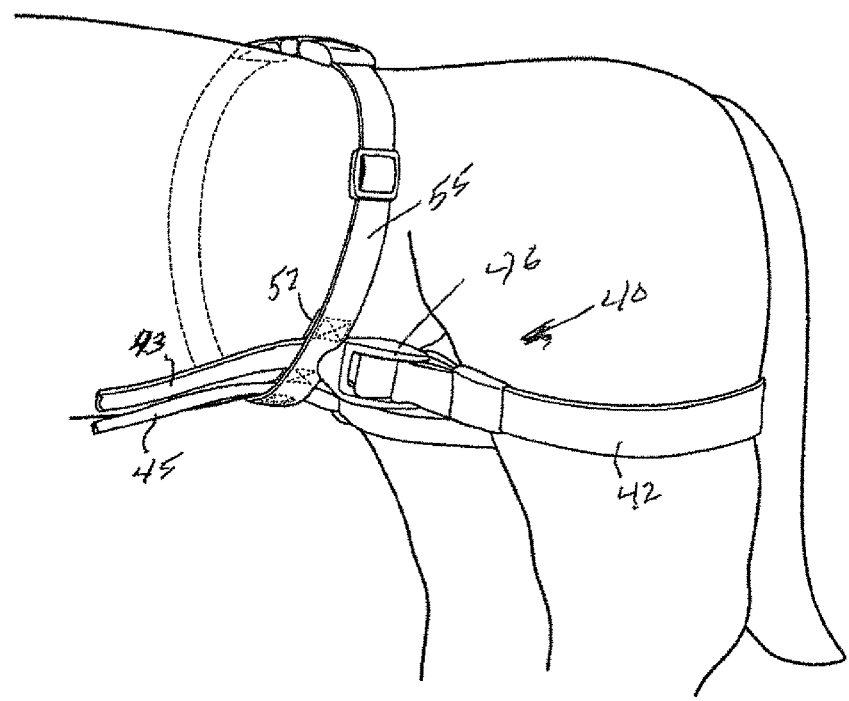
FIG. 3A is a fragmentary view of the hind quarters of a dog wearing the harness of the present invention.
Figure 3B:
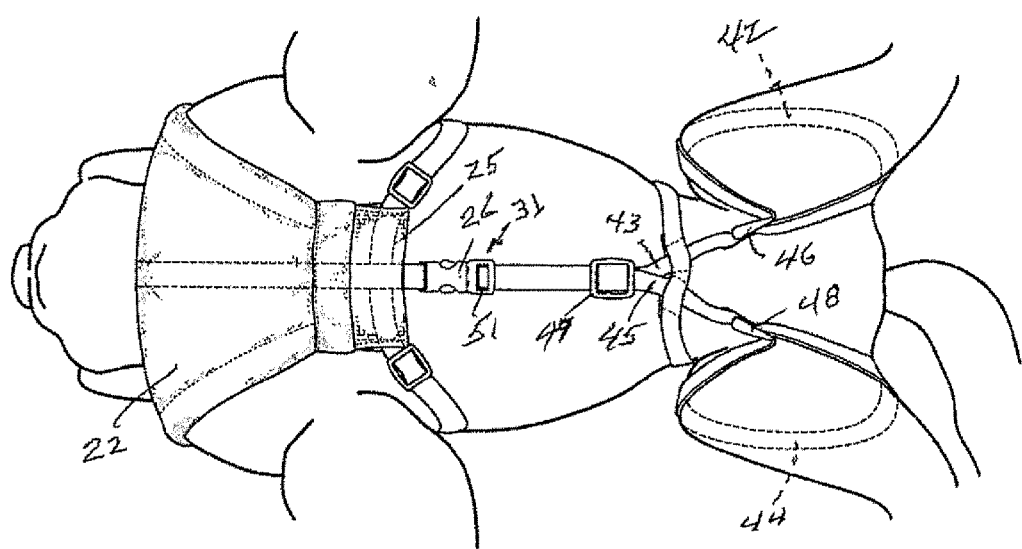
FIG. 3B is a fragmentary view of the underside of a dog wearing the harness of the present invention.
Figure 4:
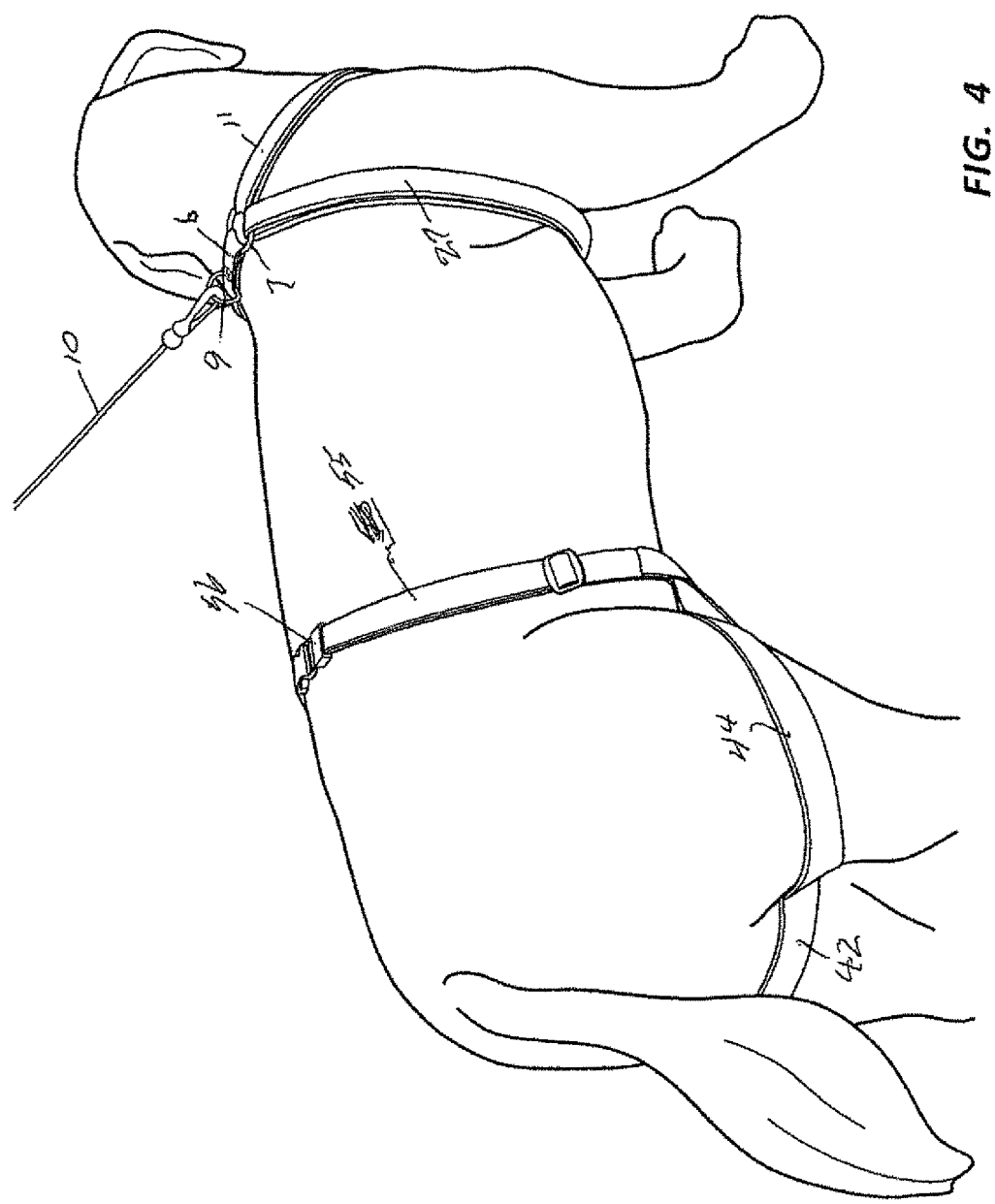
FIG. 4 is a rear quartering perspective view of a dog wearing the harness of the present invention.
Figure 5:
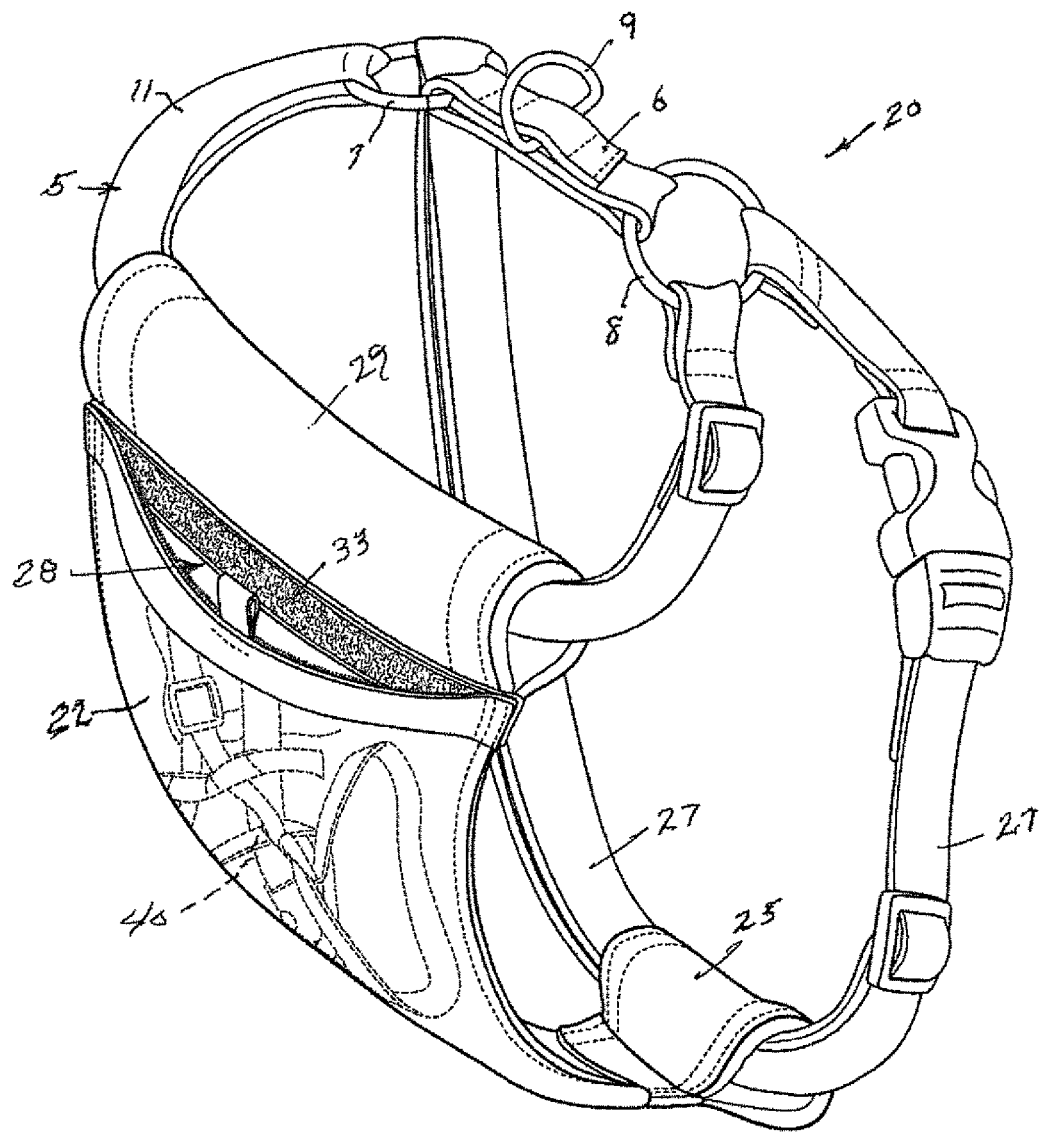
FIG. 5 is a perspective view of the anterior portion of the harness of the present invention.

This restraint is provided in the present invention by a harness 2 that broadly includes an anterior harness portion 20 (FIG. 5) and a posterior harness portion 40 (FIG. 3A). The anterior portion includes a neck collar 5 that includes a short intermediate section 6 positioned over the dog's withers, which section includes ring fasteners 7 and 8 at each of its terminal ends. A "D" ring 9 mounted centrally of the intermediate section 6 provides a connection point for a leash 10. A flexible collar band 11 is attached at each of its terminal ends to the respective ring fasteners 7 and 8 on the ends of the intermediate withers section 6 to form the closed loop collar 5.

Figure 1:
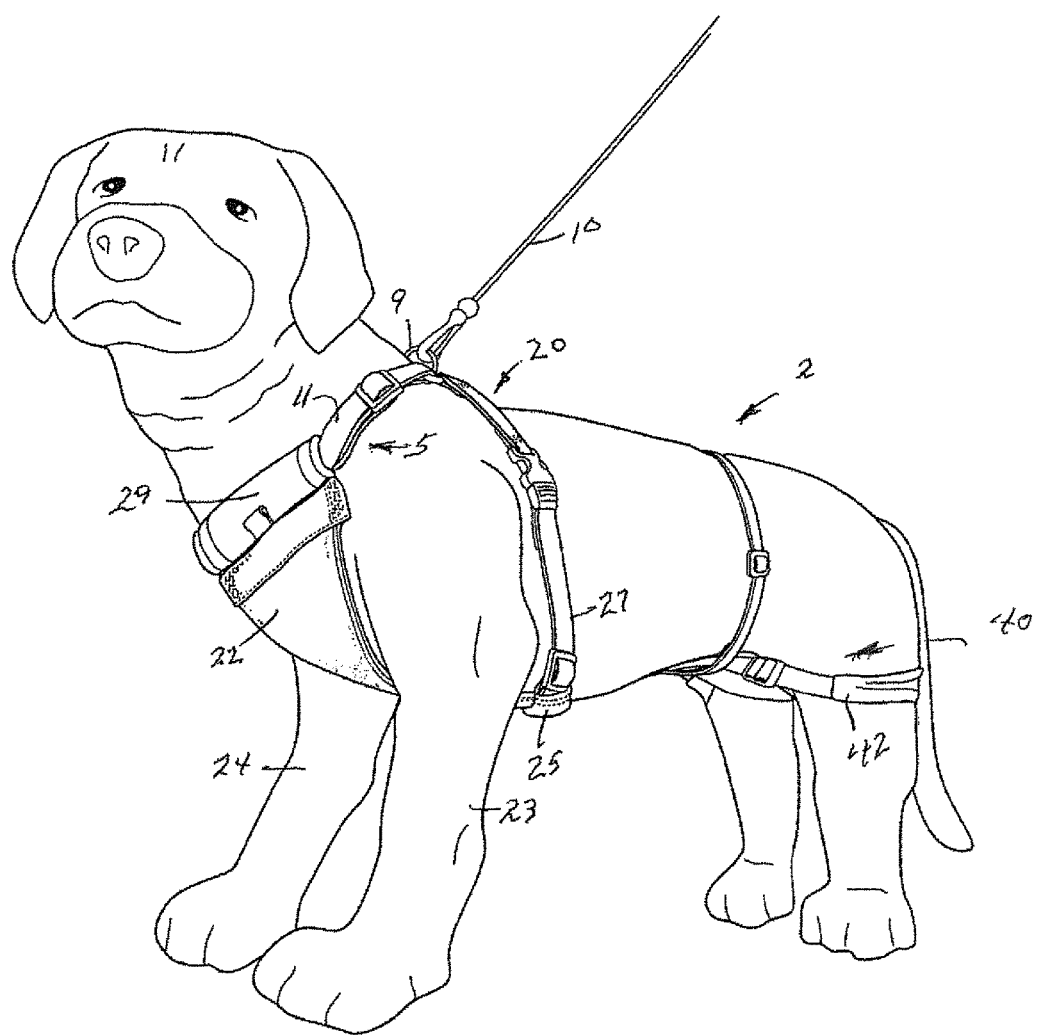
FIG. 1 is a front quartering perspective view of a dog wearing the harness of the present invention.
Figure 2A:
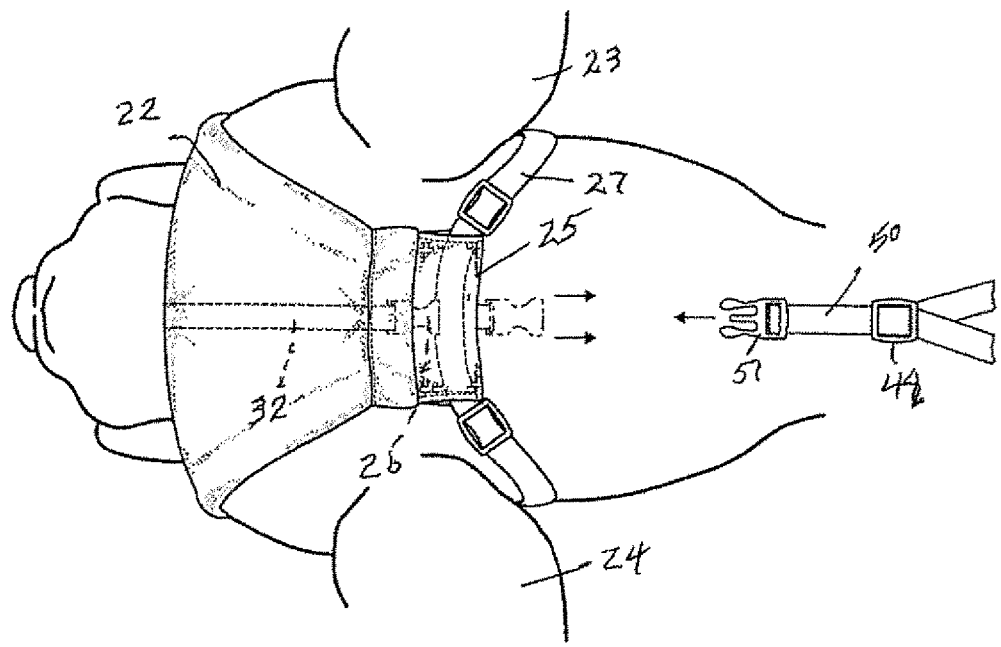
FIG. 2A is a fragmentary view of the front portion of the underside of a dog wearing the harness of the present invention and showing the female side of the abdomen strap adjustment buckle being retracted from a stored position inside the sleeve covering the abdominal portion of the brisket strap.
Figure 2B:
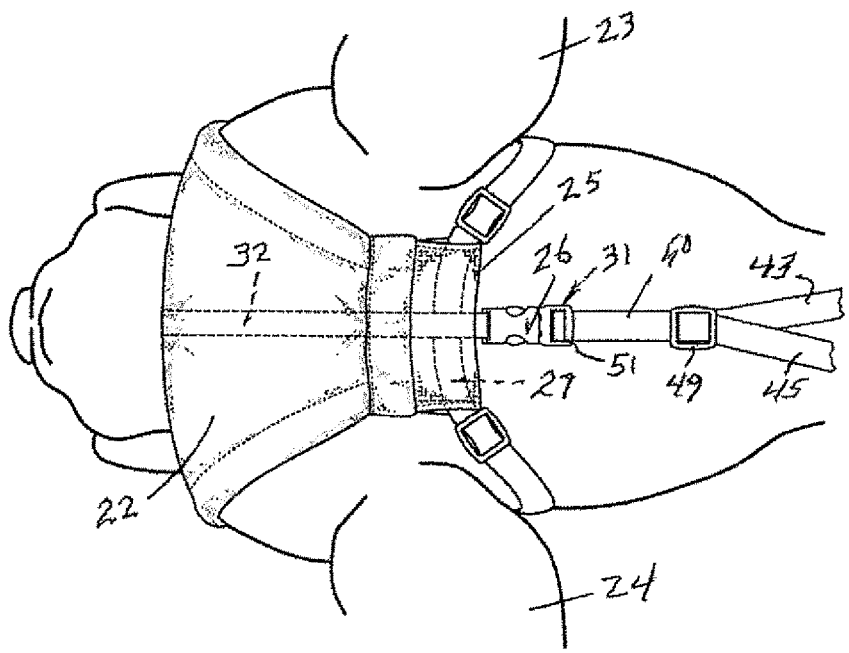
FIG. 2B is similar to FIG. 2A except that the abdomen strap adjustment buckle is shown as joined.

The anterior portion 20 also includes a fabric prosternum panel 22 that is attached by an upper casing 29 to the lower portion of the collar band 11 and tapers downwardly over the chest to a position between the forearms 23 and 24 of the dog, terminating in a lower casing 25 that encases an adjustable brisket cinch 27. The panel 22 can be a single layer of material, but preferably, it comprises a pouch having inner and outer sides. Just below the collar band 11, the pouch includes an upper opening 28 that communicates with the interior of the pouch for the insertion and storage of the straps comprising the posterior harness portion 40 when that portion is not is use. As seen in FIGS. 2A and 2B, the female side 26 of a buckle 31 is attached to a chest strap 32 that lies within the pouch 22 and whose upper terminal end is sewn to the backside of the back edge 33 of the pouch opening 28. When only the anterior portion of the harness is in use, the female side 26 is tucked into the casing 25.

Included in the anterior portion is a brisket cinch 27 that comprises an adjustable length strap whose terminal ends are folded over and through the respective fastening rings 7 and 8 disposed on the withers section 6. The mid portion of the cinch passes through the casing 25 at the lower terminal end of the prosternum pouch 22.

The posterior portion 40 of the harness includes a pair of hind leg loops 42 and 44 that are size adjustable with buckles 46 and 48 respectively. The free ends 43 and 45 of the leg loops 42 and 44 are merged together under the dog's belly to form a "Y," the stem 50 of which passes through a length adjustment buckle 49 and terminates in the male side 51 of the connecting buckle 31, comprising an abdominal connecting link. Buckling the male side 51 to the female side 26 acts to interconnect the anterior harness portion 20 with the posterior portion 40 which implements the full operation of the no jump harness.

An adjustable loin loop that encircles the loin of the dog includes a strap 55 and an adjustment buckle 56. An overlying band 57 is sewn to a short length of the inside of the strap 55 creating two spaces through which the free ends 43 and 45 of the leg loops pass, thus supporting the free ends close to the dog's body and maintaining the leg loops 42 and 44 above the stifles of each hind leg.

The combined features of the anterior portion of the harness operate to form a harness anchor point between the forelegs of the dog. As the dog anticipates jumping and attempts to elongate the distance between its forearms and hind legs it is prevented from doing so by the abdominal connecting link that interconnects the anchor point and the dog's hind legs. As the jumping prone dog attempts to elongate the distance between its forearms and hind legs it is prevented from doing so by the fixed length of the abdominal connecting link. As the dog attempts to elongate its forechest and neck in the jumping stance, it is prevented from do so by the fixed length prosternum pouch 22 that interconnects the neck collar with the anchor point between the dog's forearms.

The harness of the present invention thus provides a double restriction to a dog's tendency to jump.

I claim:

1. A dog harness to deter jumping comprising,
   anterior and posterior harness portions, the anterior portion including,
   a neck collar,
   a brisket cinch, and
   a fabric pouch overlying the forechest of the dog and interconnecting the neck collar and the brisket cinch at a harness anchor point below the dog's chest.

2. The harness of claim 1 where the posterior harness portion includes, a pair of hind leg loops with free ends that respectively encircle each hind leg of a dog above the stifle, means for merging the free ends to form a single abdominal connecting link that underlies the belly and abdomen of a dog, and a buckle and strap interconnecting the abdominal connecting link to the harness anchor point.

3. The harness of claim 2 and further including a loin loop that slidingly engages the free ends of the leg loops beneath the belly of the dog.

* * * * *